(12) United States Patent
Ito et al.

(10) Patent No.: US 10,408,153 B2
(45) Date of Patent: Sep. 10, 2019

(54) ENGINE CONTROL DEVICE

(71) Applicant: SUBARU CORPORATION, Tokyo (JP)

(72) Inventors: Makoto Ito, Tokyo (JP); Ryotaro Yamaguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/013,873

(22) Filed: Jun. 20, 2018

(65) Prior Publication Data

US 2019/0093586 A1 Mar. 28, 2019

(30) Foreign Application Priority Data

Sep. 28, 2017 (JP) ................................. 2017-187760

(51) Int. Cl.
*F02D 41/22* (2006.01)
*F02B 37/18* (2006.01)
(Continued)

(52) U.S. Cl.
CPC .............. *F02D 41/22* (2013.01); *F02B 37/16* (2013.01); *F02B 37/18* (2013.01);
(Continued)

(58) Field of Classification Search
CPC .... F02B 37/16; F02B 37/18; F02D 2041/224; F02D 2200/0602; F02D 2200/0618; F02D 41/0007; F02D 41/22; F02M 65/003
See application file for complete search history.

(56) References Cited

U.S. PATENT DOCUMENTS 4,879,673 A * 11/1989 Nagase ................... F02D 41/22
702/100
6,460,514 B1 * 10/2002 Imai ..................... F02D 41/0007
123/479
(Continued)

FOREIGN PATENT DOCUMENTS

JP    H02-023226 A    1/1990
JP    11-350966 A    12/1999
(Continued)

OTHER PUBLICATIONS

Japanese Decision to Grant a Patent issued in corresponding Japanese Patent Application No. 2017-187760, dated Jan. 25, 2019.
(Continued)

*Primary Examiner* — Jesse S Bogue
(74) *Attorney, Agent, or Firm* — McDermott Will & Emery LLP

(57) ABSTRACT

An engine control device controls an engine including a turbo-supercharger, a waste gate valve, an air-bypass valve, and a high-pressure fuel system. The engine control device includes: an air-bypass valve control unit and an abnormality detection unit. The air-bypass valve control unit controls the air-bypass valve. The abnormality detection unit detects an abnormality in the high-pressure fuel system. The air-bypass valve control unit increases an opening degree of the air-bypass valve in accordance with detection of the abnormality by the abnormality detection unit.

3 Claims, 2 Drawing Sheets

(51) Int. Cl.
   *F02B 37/16*   (2006.01)
   *F02D 41/00*   (2006.01)
   *F02M 65/00*   (2006.01)
(52) U.S. Cl.
   CPC ....... *F02D 41/0007* (2013.01); *F02M 65/003* (2013.01); *F02D 2041/224* (2013.01); *F02D 2200/0602* (2013.01); *F02D 2200/0618* (2013.01)

(56) References Cited

U.S. PATENT DOCUMENTS

| | | | |
|---|---|---|---|
| 8,417,438 B2 * | 4/2013 | Tsunooka | F02B 37/18 60/602 |
| 9,103,270 B2 * | 8/2015 | Tsunooka | F01N 3/10 |
| 9,279,371 B2 * | 3/2016 | Fulton | F02D 41/22 |

FOREIGN PATENT DOCUMENTS

| | | |
|---|---|---|
| JP | 2003-254072 A | 9/2003 |
| JP | 2008-075599 A | 4/2008 |
| JP | 2008-190342 A | 8/2008 |

OTHER PUBLICATIONS

Japanese Office Action issued in Japanese Patent Application No. 2017-187760, dated Nov. 20, 2018, with English Translation.

* cited by examiner

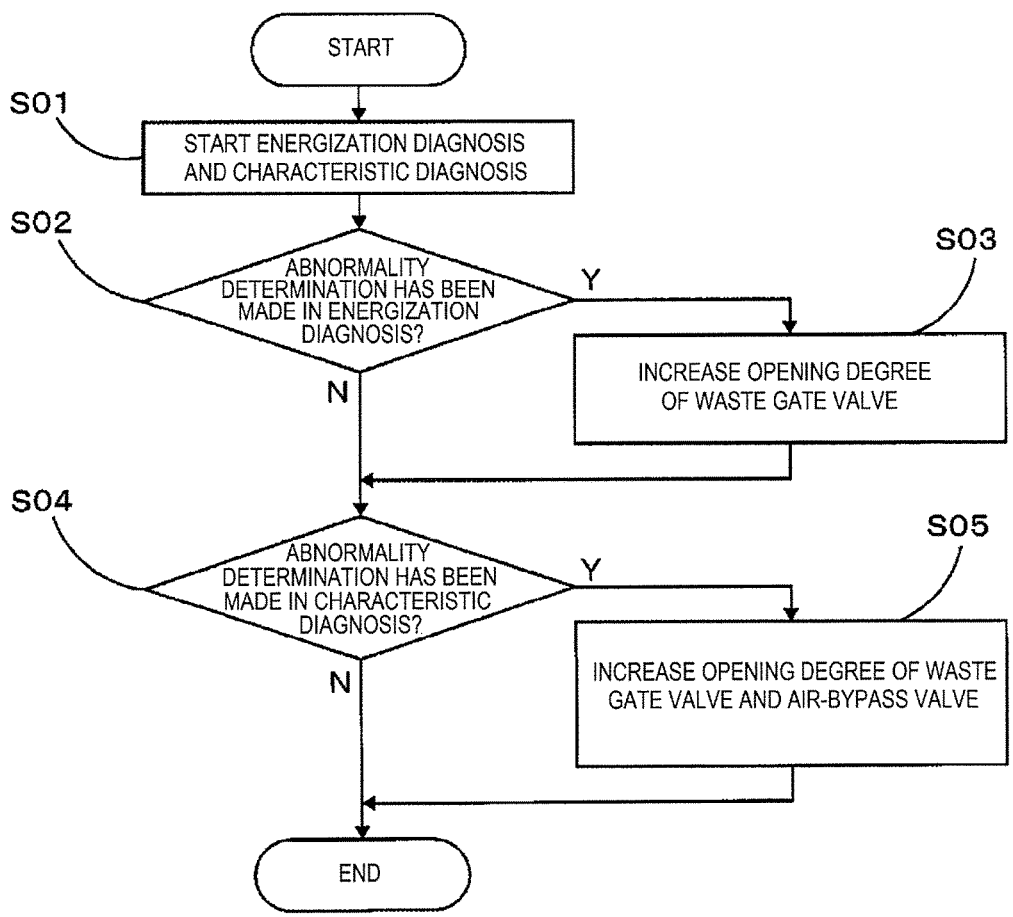

ENGINE CONTROL DEVICE

CROSS-REFERENCE TO RELATED APPLICATIONS

The present application claims priority from Japanese Patent Application No. 2017-187760 filed on Sep. 28, 2017, the entire contents of which are hereby incorporated by reference.

BACKGROUND

1. Technical Field

The present invention relates to an engine control device that controls a supercharged engine having a high-pressure fuel system.

2. Related Art

For instance, a direct injection gasoline engine to be mounted to an automobile is provided with a high-pressure fuel system that boosts the pressure of fuel supplied by a feed pump (low-pressure pump) from a fuel tank by using a high-pressure pump, supplies the fuel to an injector, and performs high-pressure injection.

If an abnormality such as a malfunction of a component occurs and the pressure of fuel supplied to the injector is reduced in such a high-pressure fuel system, fuel injection may be disabled depending on the cylinder pressure during injection and an engine stall may be caused. Accordingly, it is necessary to perform fail-safe control that enables fuel injection even when an abnormality occurs.

One technique for such fail-safe control is proposed in which the intake air pressure is limited by control of the supercharging pressure to prevent the cylinder pressure from exceeding the fuel pressure supplied to the injector when a malfunction occurs in a high-pressure fuel system in the case of a supercharged engine.

As a related art concerning fail-safe during occurrence of an abnormality in a high-pressure fuel system, for instance, Japanese Unexamined Patent Application Publication No. 2008-190342 discloses a technique for controlling a waste gate valve and a throttle valve so as to reduce the intake air amount when the actual fuel pressure, which is the pressure of fuel actually supplied to a fuel injection valve, is lower than a target fuel pressure, which is the pressure of fuel supplied to the fuel injection valve required depending on the operation of the engine.

SUMMARY OF THE INVENTION

An aspect of the present invention provides an engine control device configured to control an engine. The engine include a turbo-supercharger that has a turbine to be driven by exhaust gas and a compressor to be driven by the turbine, a waste gate valve provided in a waste gate passage that allows the exhaust gas to bypass the turbine, an air-bypass valve provided in an air-bypass passage that allows fresh air to bypass the compressor, and a high-pressure fuel system that has a high-pressure fuel pump configured to boost a pressure of fuel supplied from a feed pump and an injector configured to inject the fuel discharged by the high-pressure fuel pump. The engine control device includes: an air-bypass valve control unit configured to control the air-bypass valve; and an abnormality detection unit configured to detect an abnormality in the high-pressure fuel system. The air-bypass valve control unit is configured increase an opening degree of the air-bypass valve in accordance with detection of the abnormality by the abnormality detection unit.

An aspect of the present invention provides an engine control device configured to control an engine. The engine include a turbo-supercharger that has a turbine to be driven by exhaust gas and a compressor to be driven by the turbine, a waste gate valve provided in a waste gate passage that allows the exhaust gas to bypass the turbine, an air-bypass valve provided in an air-bypass passage that allows fresh air to bypass the compressor, and a high-pressure fuel system that has a high-pressure fuel pump configured to boost a pressure of fuel supplied from a feed pump and an injector configured to inject the fuel discharged by the high-pressure fuel pump. The engine control device includes circuitry configured to control the air-bypass valve, and to detect an abnormality in the high-pressure fuel system. The circuitry is configured increase an opening degree of the air-bypass valve in accordance with detection of the abnormality.

BRIEF DESCRIPTION OF THE DRAWINGS

FIG. 2 is a flowchart illustrating fail-safe control when an abnormality occurs in a high-pressure fuel system of the engine control device according to the example.

DETAILED DESCRIPTION

Figure 1:
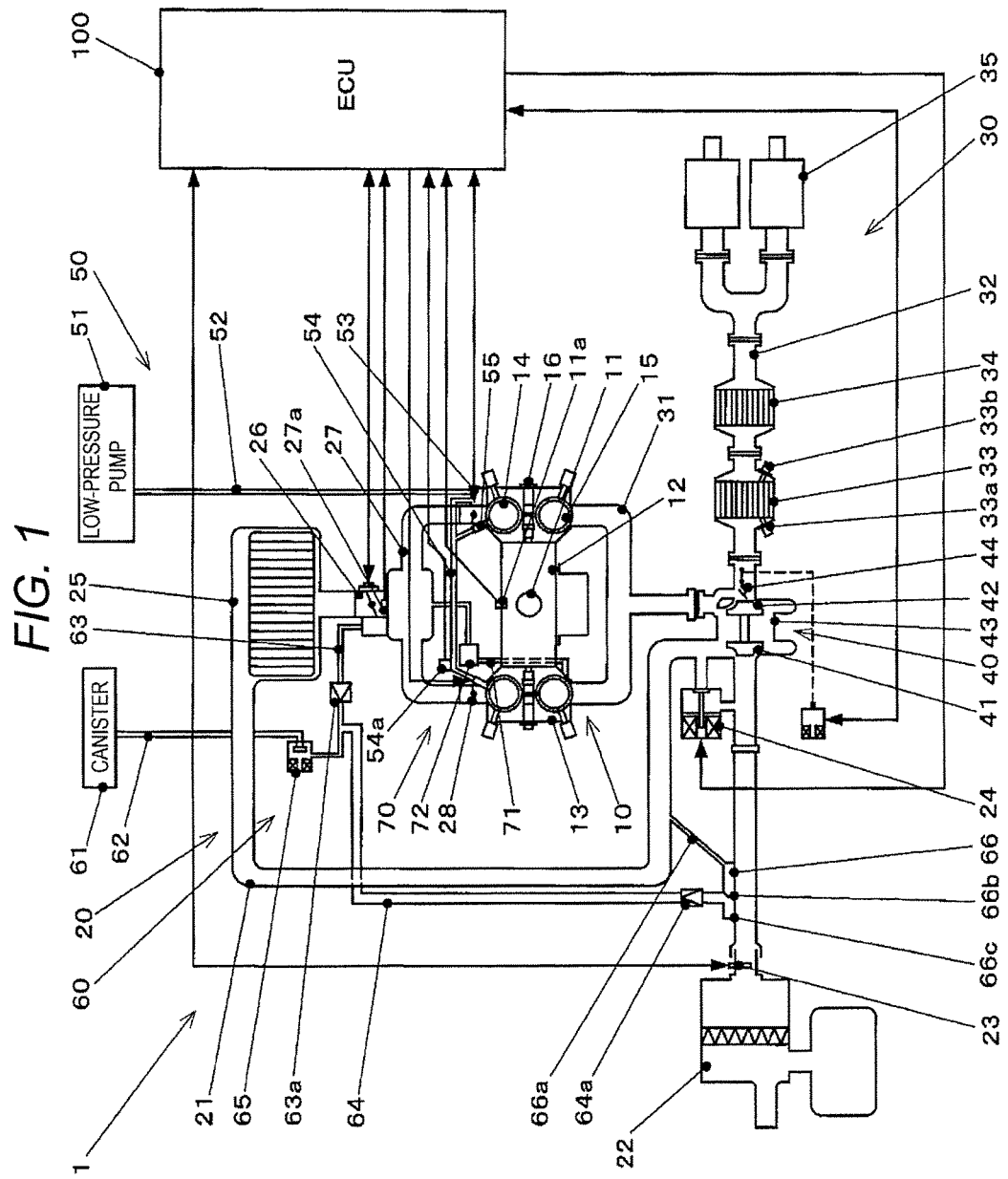
FIG. 1 schematically illustrates the structure of an engine having an engine control device according to an example of the present invention.

Hereinafter, an example of the present invention will be described with reference to the drawings. Note that the following description is directed to an illustrative example of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. Throughout the present specification and the drawings, elements having substantially the same function and configuration are denoted with the same reference numerals to avoid any redundant description.

Although the flow rate of exhaust gas supplied to a turbine is reduced and the supercharging pressure is reduced when the waste gate valve is opened by the fail-safe control described above, there is some delay (time lag) of a time response before the rotational speed of the turbine is reduced and the supercharging pressure is actually reduced because of the effect of the inertia of rotary components and the like. In addition, as diagnosis methods for a high-pressure fuel system, there are energization diagnosis that detects an abnormality based on the energization state of an injector and characteristic diagnosis that detects an abnormality based on the alienation of the transition of the fuel pressure during operation of the engine from normal values.

Characteristic diagnosis takes relatively longer time than energization diagnosis until the diagnosis ends. Accordingly, when no abnormality is detected in energization diagnosis and an abnormality is detected in characteristic diagnosis, suppression of in-cylinder pressure is too late even if opening of the waste gate valve is started after abnormality diagnosis is made, possibly causing an engine stall.

It is desirable to provide an engine control device that prevents an engine stall when an abnormality occurs in a high-pressure fuel system.

The engine control device according to the example is provided in a direct injection turbocharged gasoline engine that is mounted as a traveling power source in, for instance, an automobile such as a passenger car.

FIG. 1 schematically illustrates the structure of an engine having the engine control device according to the example.

As illustrated in FIG. 1, an engine 1 includes a main body 10, an intake system 20, an exhaust system 30, a turbocharger 40, a fuel supply device 50, an evaporated fuel processing device 60, an EGR device 70, an engine control unit (ECU) 100, and the like.

The main body 10 is a main engine part of the engine 1 and is, for instance, a horizontally-opposed four-cylinder four-stroke DOHC gasoline direct injection engine.

The main body 10 includes a crankshaft 11, a cylinder block 12, a cylinder head 13, an intake valve drive system 14, an exhaust valve drive system 15, an ignition plug 16, and the like.

The crankshaft 11 is an output shaft of the engine 1 and the pistons (not illustrated) of individual cylinders are coupled to the crankshaft 11 via connecting rods (conrods).

The cylinder block 12 is a block-shaped member that has the cylinders, and is divided into two right and left parts with the crankshaft 11 interposed therebetween.

A right half of the cylinder block 12 (right and left described here indicate right and left of the vehicle body when the engine is mounted with the cylinder block 12 vertically disposed) is provided with first and third cylinders sequentially from a vehicle front side and a left half thereof is provided with second and fourth cylinders.

A crankcase that accommodates the crankshaft 11 is provided in a joined section between the right and left halves of the cylinder block 12.

The crankshaft 11 is rotatably supported by a main bearing that is provided in the cylinder block 12.

The cylinder block 12 is provided with a crank angle sensor 11a that detects the angle position of the crankshaft 11.

The cylinder head 13 is provided at each of the right and left ends of the cylinder block 12.

The cylinder head 13 includes a combustion chamber, an intake port, an exhaust port, an intake valve, an exhaust valve, and the like.

The combustion chamber is a recessed section provided so as to face a crown surface of the piston (not illustrated), and configures a part of a space in which air-fuel mixture compressed by the piston is combusted.

The intake port is a passage through which combustion air is introduced into the combustion chamber. In one example the combustion air may serve as "fresh air".

The exhaust port is a passage through which burnt gas is discharged from the combustion chamber. In one example the burnt gas may serve as "exhaust gas".

The intake valve and the exhaust valve open and close the intake port and the exhaust port, respectively, at predetermined valve timing.

Each of the intake valve drive system 14 and the exhaust valve drive system 15 includes a cam sprocket that is driven by a crankshaft sprocket provided, for instance, at an end of the crankshaft 11 via an timing chain (not illustrated), a camshaft that is driven by the cam sprocket, and the like.

In addition, each of the intake valve drive system 14 and the exhaust valve drive system 15 includes a valve timing variable mechanism that causes relative rotation of the cam sprocket and the camshaft about a rotation center shaft by using a hydraulic actuator.

The ignition plug 16 produces an electric spark in the combustion chamber at a predetermined ignition timing in accordance with an ignition signal issued by the ECU 100 to ignite the air-fuel mixture.

The intake system 20 sucks outside air and introduces the outside air as combustion air into the intake port of the cylinder head 13.

The intake system 20 includes an intake duct 21, an air cleaner 22, an airflow meter 23, an air-bypass valve 24, an intercooler 25, a throttle 26, an intake manifold 27, a tumble generator valve 28, and the like.

The intake duct 21 is a pipe line through which the combustion air sucked from the outside is delivered.

As described later, a compressor 41 of the turbocharger 40 is provided in an intermediate portion of the intake duct 21.

The air cleaner 22 is provided near an inlet of the intake duct 21 and includes an air cleaner element that filters foreign substances such as dust, an air cleaner case that accommodates the air cleaner element, and the like.

The airflow meter 23 is a sensor that is provided in an outlet portion of the air cleaner 22 and measures the flow rate of air flowing therethrough.

The output of the airflow meter 23 is transmitted to the ECU 100 and is used for control of a fuel injection amount and the like, estimation of the load state, and the like.

The air-bypass valve 24 opens and closes a bypass passage that causes part of the air flowing through the intake duct 21 to bypass the section between an upstream side and a downstream side of the compressor 41.

The opening degree (amount of bypassing air) of the air-bypass valve 24 can be changed in accordance with a command from the ECU 100. The air-bypass valve 24 may be a valve whose opening degree is switched between full opening and full closing or may be a valve whose opening degree can be controlled at any opening degree between full opening and full closing, for instance.

When the air-bypass valve 24 is opened during turbocharging, part of the turbocharged fresh air on the downstream side of the compressor 41 in the intake duct 21 is recirculated to the upstream side of the compressor 41.

In this way, the differential pressure between the upstream side and the downstream side of the compressor 41 can be reduced.

The air-bypass valve 24 is opened to, for instance, protect a blade of a turbine 42 during deceleration or suppress a flow rate of purge gas during stuck open malfunction of a purge valve 65 and the air-bypass valve 24 is closed in a normal time.

In addition, the air-bypass valve 24 is opened to suddenly reduce the supercharging pressure during malfunction of the high-pressure fuel system in the present example. This function will be described in detail later.

The intercooler 25 cools the air that has been compressed by the compressor 41 through heat exchange with, for instance, travel wind (an airflow generated on the vehicle body by a travel of the vehicle).

The throttle 26 includes a throttle valve that adjusts an intake air amount to adjust the output of the engine 1.

The throttle valve is an electric butterfly valve that is opened and closed by an electric actuator to have a specified opening degree in accordance with a command from the ECU 100.

The throttle 26 is disposed adjacently to an outlet of the intercooler 25.

A pressure sensor (not illustrated) that detects the pressure of an intake pipe is provided on the inlet side (upstream side) of the throttle 26.

The output of the pressure sensor is transmitted to the ECU 100.

The intake manifold 27 is a branched pipe that distributes the air discharged from the throttle 26 to the intake ports of the cylinders.

The intake manifold 27 is provided with a pressure sensor 27a that detects the pressure of the intake pipe on a downstream side of the throttle 26.

The output of the pressure sensor 27a is transmitted to the ECU 100.

The tumble generator valve (TGV) 28 is a gas flow control valve that is provided in a passage of the intake manifold 27, switches the state of an air passage from the intake manifold 27 to the intake port, and thereby controls the state of a tumble flow generated in the cylinder.

The cross section of the passage in the intake manifold 27 in a part of region on the downstream side (side close to the intake port) is divided into two regions by a partition wall (not illustrated).

The TGV 28 makes a transition between a closed state in which the passage on one side of the partition wall is substantially closed and an opened state in which the passage is opened.

The TGV 28 in the closed state has the function of promoting a tumble flow in the cylinder to the opened state.

The exhaust system 30 discharges the burnt gas (the exhaust gas) from the exhaust port of the cylinder head 13.

The exhaust system 30 includes an exhaust manifold 31, an exhaust pipe 32, a front catalyst 33, a rear catalyst 34, a silencer 35, and the like.

The exhaust manifold 31 is an exhaust gas passage (pipe line) that collects the exhaust gas discharged from the exhaust ports of the cylinders and introduces the exhaust gas into the turbine 42 of the turbocharger 40.

The exhaust pipe 32 is an exhaust gas passage (pipe line) through which the exhaust gas from the turbine 42 of the turbocharger 40 is discharged to the outside.

The front catalyst 33 and the rear catalyst 34 are provided sequentially from the turbine 42 in an intermediate part of the exhaust manifold 31.

Each of the front catalyst 33 and the rear catalyst 34 is a three-way catalyst in which a carrier such as alumina carries a precious metal such as platinum, rhodium, or palladium to perform reduction processing of HC, CO, and NOx.

A front A/F sensor 33a and a rear A/F sensor 33b are provided at an inlet portion and an outlet portion of the front catalyst 33, respectively, to detect the air-fuel ratio (A/F) based on the property of the exhaust gas.

The output of the front A/F sensor 33a and the output of the rear A/F sensor 33b are transmitted to the ECU 100 and are used for air-fuel ratio feedback control of the fuel injection amount, deterioration diagnosis of the front catalyst 33, and the like.

The silencer 35 is disposed adjacently to an outlet portion of the exhaust pipe 32, reduces sound energy of the exhaust gas, and thereby suppresses exhaust noise.

The exhaust pipe 32 is branched into, for instance, two pipes near the outlet portion and the silencers 35 are provided on the downstream side of the branched position.

The turbocharger 40 is an exhaust gas turbine supercharger that compresses fresh air by using the energy of the exhaust gas.

The turbocharger 40 includes the compressor 41, the turbine 42, a bearing housing 43, a waste gate valve 44, and the like.

The compressor 41 is a centrifugal compressor that compresses the combustion air.

The turbine 42 drives the compressor 41 by using the energy of the exhaust gas.

The bearing housing 43 is provided between the compressor 41 and the turbine 42.

The bearing housing 43 couples the housings of the compressor 41 and the turbine 42 and includes a bearing that rotatably supports a shaft coupling a compressor wheel and a turbine wheel, a lubricating device, and the like.

The waste gate valve 44 opens and closes a waste gate passage that causes part of the exhaust gas to bypass the section from an inlet side to an outlet side of the turbine 42.

The waste gate valve 44 includes an electric actuator that opens and closes the waste gate valve 44 and an opening degree sensor (not illustrated) that detects an opening degree position, and the opening degree thereof is controlled by the ECU 100.

The fuel supply device 50 has the high-pressure fuel system that supplies fuel to the cylinders of the engine 1.

The fuel supply device 50 includes a low-pressure pump 51, a feed line 52, a high-pressure pump 53, a high-pressure fuel line 54, an injector 55, and the like.

The low-pressure pump 51 is a feed pump that causes the fuel tank, which is a container in which gasoline as fuel is stored, to discharge fuel and delivers the discharged fuel to the high-pressure pump 53.

The feed line 52 is a fuel passage through which the fuel discharged by the low-pressure pump 51 is delivered to the high-pressure pump 53.

The high-pressure pump 53 is attached to the cylinder head 13, is driven via the camshaft, and thereby boosts the fuel pressure.

The high-pressure pump 53 includes a plunger that reciprocates in the cylinder in conjunction with rotation of the camshaft to pressurize the fuel and an electromagnetic metering valve, and can adjust the fuel pressure in the high-pressure fuel line 54 by controlling the duty ratio of the electromagnetic metering valve by the ECU 100.

The high-pressure fuel line 54 is a fuel passage through which the fuel boosted by the high-pressure pump 53 is delivered to the injector 55 provided in each of the cylinders.

The high-pressure fuel line 54 is provided with a fuel pressure sensor 54a that detects the pressure of the internal fuel.

The output of the fuel pressure sensor 54a is transmitted to the ECU 100.

The injector 55 is an injection valve that performs cylinder injection of the fuel supplied from the high-pressure fuel line 54 into the combustion chamber of each of the cylinders in accordance with an injection signal from the ECU 100.

The injector 55 is opened in accordance with a drive current produced in accordance with a valve opening signal generated by the ECU 100 and this drive current is always monitored to check whether energization is performed normally.

The evaporated fuel processing device 60 temporarily stores, in a canister 61, evaporated fuel gas (fuel vapor) generated by evaporating the fuel (gasoline) in the fuel tank, introduces (canister purges) the evaporated fuel gas as purge gas into the intake duct 21 during operation of the engine 1, and thereby performs combustion processing in the combustion chamber.

The evaporated fuel processing device 60 includes the canister 61, purge lines 62, 63, and 64, the purge valve 65, an ejector 66, and the like.

The canister 61 is a charcoal canister that accommodates activated charcoal capable of adsorbing the evaporated fuel gas in a case.

The evaporated fuel gas is introduced from the fuel tank into the canister 61 via a pipe (not illustrated).

Each of the purge lines 62, 63, and 64 is a pipe line through which the evaporated fuel gas stored in the canister 61 is introduced as the purge gas into the intake duct 21 of the intake system 20 during operation of the engine 1.

An end on the upstream side of the purge line 62 is coupled to the canister 61 and an end on the downstream side thereof is coupled to an inlet side of the purge valve 65.

An end on the upstream side of the purge line 63 is coupled to an outlet side of the purge valve 65 and an end on the downstream side thereof is coupled to the intake manifold 27.

A check valve 63a is provided in an intermediate portion of the purge line 63.

The check valve 63a is a check valve that prevents the reverse flow of the purge gas from the intake manifold 27 to the purge valve 65.

The purge line 64 is used to introduce part of the purge gas that has flowed out of the purge valve 65 to the purge line 63 into the ejector 66.

The purge line 64 is branched from a region of the purge line 63 between the purge valve 65 and the check valve 63a, and an end on the downstream side thereof is coupled to a region of the ejector 66 that is on the downstream side of a nozzle 66b.

A check valve 64a is provided in an intermediate portion of the purge line 64.

The check valve 64a is a check valve that prevents the reverse flow of the purge gas from the ejector 66 to the purge valve 65.

The purge valve 65 is an electromagnetic valve that can be switched between an opened state where the purge gas can flow from the purge line 62 to the purge lines 63 and 64 and a closed state where the purge line 62 and the purge line 63 are blocked from each other.

The purge valve 65 is opened and closed in accordance with an opening command or a closing command from the ECU 100.

The ejector 66 is a negative pressure generator that sucks the purge gas by using the differential pressure between the upstream side and the downstream side of the compressor 41 of the turbocharger 40 and introduces the purge gas into the intake duct 21.

The ejector 66 is formed in a cylindrical container and includes an introduction pipe line 66a, the nozzle 66b, a discharge port 66c, and the like.

The introduction pipe line 66a is a pipe line that introduces, into an end on the upstream side of the ejector 66, the air extracted from a region on the downstream side of the compressor 41 in the intake duct 21.

The nozzle 66b increases the flow speed of a flow of the air that is introduced from the introduction pipe line 66a and flows within the ejector 66 by constricting the flow of the air, thereby generating negative pressure by the Venturous effect.

An end on the downstream side of the purge line 64 is coupled to a region on the downstream side of the nozzle 66b in the ejector 66, and the purge gas is sucked into the ejector 66 by the negative pressure generated by the nozzle 66b and is merged into the flow of the air.

The discharge port 66c is a communicating part that is provided at an end on the downstream side of the ejector 66 and introduces the air and the purge gas having been merged, from inside of the ejector 66 into a region on the upstream side of the compressor 41 in the intake duct 21.

The EGR device 70 performs exhaust gas recirculation (EGR) in which part of the exhaust gas is extracted as EGR gas from an exhaust port portion of the cylinder head 13 and the extracted EGR gas is introduced into the intake manifold 27.

The EGR device 70 includes an EGR passage 71, an EGR valve 72, and the like.

The EGR passage 71 is a pipe line through which the exhaust gas (EGR gas) is introduced from the exhaust port to the intake manifold 27.

The EGR valve 72 is a metering valve that is provided in the EGR passage 71 and adjusts the flow rate of the EGR gas.

The EGR valve 72 has a valve body driven by an electric actuator such as a solenoid.

The opening degree of the EGR valve 72 is controlled using an opening degree map set on the basis of a predetermined target EGR rate (EGR gas flow rate/intake air flow rate) by the ECU 100 in a steady state.

In addition, the EGR device 70 has an EGR cooler (not illustrated) that cools the EGR gas through heat exchange with cooling water.

The engine control unit (ECU) 100 is an engine control device that comprehensively controls the engine 1 and the auxiliary devices thereof.

The ECU 100 is coupled directly to various types of sensors provided in the engine 1 and various devices that are control targets or coupled indirectly to these sensors and devices via an in-vehicle LAN device such as a CAN communication system or the like.

The ECU 100 includes an information processing unit such as a CPU, storage units such as a RAM and a ROM, an input/output interface, a bus that couples these components, and the like.

The ECU 100 receives the output of each of the sensors provided in the engine 1 and can output control signals to control targets that include the actuators, the valves, the ignition plug, the injector, and the like provided in the engine 1.

The ECU 100 computes a driver requested torque on the basis of an operation amount (a depression amount) of an accelerator pedal (not illustrated) and the like, controls the opening degree of the throttle 26, the valve timing, the supercharging pressure, the ignition timing, the fuel injection amount, the fuel injection timing, and the like such that the torque (actual torque) actually generated by the engine 1 approximates the driver requested torque, and thereby adjusts the output (the torque) of the engine 1.

In one example, the ECU 100 may serve as an "air-bypass valve control unit" and a "waste gate valve control unit" that control the air-bypass valve 24 and a "waste gate valve" 44 in accordance with the driving state of the engine 1.

In one example, the ECU 100 may serve as an "abnormality detection unit" that detects an abnormality in the fuel supply device 50 having the high-pressure fuel system.

In the detection of an abnormality in the fuel supply device 50, for instance, energization diagnosis and characteristic diagnosis, which will be described below, are performed.

The energization diagnosis checks whether energization is performed normally by detecting the drive current of the injector 55. When, for instance, a voltage to be supplied to the injector 55 is reduced, abnormality diagnosis is made.

In one example of the present invention, energization diagnosis may serve as "first diagnosis" that ends in a relatively short time (for instance, several tens of milliseconds).

Characteristic diagnosis detects an abnormality in any components of the fuel supply device 50 on the basis of the fuel pressure detected by the fuel pressure sensor 54a.

Normally, the fuel pressure is boosted to a value close to a target fuel pressure set by the ECU 100 and, when injection is performed by the injector 55 of any of the cylinders, the fuel pressure is reduced temporarily and then boosted again.

When an abnormality occurs, the pattern indicated by such history of the fuel pressure is alienated from the normal pattern.

The ECU 100 monitors the transition (history) of the fuel pressure and compares the current fuel pressure transition pattern with a preset reference fuel pressure transition pattern and, when alienation equal to or more than a predetermined value is continuously detected, abnormality diagnosis is made.

In one example of the present invention, characteristic diagnosis may serve as second diagnosis that needs a relatively longer time (for instance, several seconds) for diagnosis than energization diagnosis.

FIG. 2 is a flowchart illustrating fail-safe control when an abnormality occurs in the high-pressure fuel system of the engine control device according the example.

The steps of the operation will be described in sequence below.

Step S01: Start the Diagnosis of the High-Pressure Fuel System

The ECU 100 starts the diagnosis of the high-pressure fuel system.

The diagnosis of the high-pressure fuel system is performed on the basis of the energization diagnosis and the characteristic diagnosis described above.

Then, the processing proceeds to step S02.

Step S02: Determine Whether Abnormality Determination has Been Made in Energization Diagnosis The ECU 100 decides whether abnormality determination of the high-pressure fuel system has been made in energization diagnosis.

When abnormality determination has been made, the processing proceeds to step S03. When abnormality determination has not been made, the processing proceeds to step S04.

Step S03: Increase the Opening Degree of the Waste Gate Valve

The ECU 100 reduces the flow rate of exhaust gas introduced into the turbine 42 and the supercharging pressure of the turbocharger 40 by increasing the opening degree of the waste gate valve 44, so that the cylinder pressure during fuel injection does not exceed the fuel pressure.

In the specification and claims, "increasing an opening degree" includes a transition from a closed state to an opened state and a transition from an opened state to an opened state (including a fully opened state) having a larger opening degree.

For instance, the waste gate valve 44 is fully opened. At this time, the opening degree of the throttle 26 may be restricted to reduce the intake air amount and suppress the cylinder pressure.

It should be noted that the opening degree of the air-bypass valve 24 is maintained. Normally, the air-bypass valve 24 is in the closed state.

Then, the processing proceeds to step S04.

Step S04: Determine Whether Abnormality Determination has Been Made in Characteristic Diagnosis The ECU 100 determines whether abnormality determination of the high-pressure fuel system has been made in characteristic diagnosis.

When abnormality determination has been made, the processing proceeds to step S05. When abnormality determination has not been made, a series of processes is completed (returned).

Step S05: Increase the Opening Degrees of the Waste Gate Valve and the Air-Bypass Valve The ECU 100 increases the opening degree of the waste gate valve 44 and increases the opening degree of the air-bypass valve 24.

For instance, the ECU 100 fully opens the waste gate valve 44 and the air-bypass valve 24.

When the air-bypass valve 24 is opened, part of the turbocharged fresh air on the downstream side of the compressor 41 is recirculated to the upstream side of the compressor 41. Combined with the supercharging pressure suppressing effect obtained by opening the waste gate valve 44, the intake air pressure on the downstream side of the compressor 41 is suddenly reduced and the cylinder pressure during fuel injection is suppressed so as not to exceed the fuel pressure.

At this time, the opening degree of the throttle 26 may be restricted to reduce the intake air amount and suppress the cylinder pressure.

Then, a series of processes is completed (returned).

According to the example described above, the following effects can be obtained.

(1) By opening the air-bypass valve 24 from a fully closed state to a fully opened state when an abnormality occurs in the high-pressure fuel system, the supercharging pressure can be reduced suddenly, the intake air pressure can be suppressed, and the cylinder pressure can be reduced, as compared with the related art that increases the opening degree of only the waste gate valve 44.

With this, even when an abnormality occurs in the high-pressure fuel system, fuel injection can be performed and an engine stall can be prevented.

(2) When an abnormality is detected in a short time in energization diagnosis, it is possible to prevent a sudden change in the engine output torque and occurrence of a shock due to sudden reduction in the supercharging pressure by increasing the opening degree of only the waste gate valve 44.

On the other hand, when an abnormality is detected in characteristic diagnosis that needs a relatively long time, occurrence of an engine stall can be prevented by suddenly reducing the supercharging pressure by opening the air-bypass valve 24.

(3) The supercharging pressure can be suppressed appropriately in accordance with the diagnosis time required for each diagnosis method and the effects described above can be surely achieved.

As described above, it is possible to provide an engine control device that prevents an engine stall when an abnormality occurs in a high-pressure fuel system.

Modification Example

The present invention is not limited to the example described above, various modifications and changes can be made, and the modifications and changes also fall within the technical scope of the present invention.

(1) The structures of the engine control device and the engine are not limited to those described in the above example and can be changed as appropriate.

For instance, the cylinder layout, the number of cylinders, the fuel injection method, the valve drive method, the presence or absence and the type of a supercharger of the engine are not limited to the structure in the example and can be changed as appropriate.

(2) The method of detecting an abnormality in the high-pressure fuel system is not limited to the energization diagnosis and the characteristic diagnosis in the example and can be changed as appropriate.

(3) Although the opening degrees of the waste gate valve and the air-bypass valve are fully opened in the example when an abnormality occurs in the high-pressure fuel system, the invention is not limited to the example and, when an engine stall can be prevented by increasing the opening degrees within intermediate opening degrees, this method may be used.

The invention claimed is:

1. An engine control device configured to control an engine,
the engine comprising
a turbo-supercharger that has a turbine to be driven by exhaust gas and a compressor to be driven by the turbine,
a waste gate valve provided in a waste gate passage that allows the exhaust gas to bypass the turbine,
an air-bypass valve provided in an air-bypass passage that allows fresh air to bypass the compressor, and
a high-pressure fuel system that has a high-pressure fuel pump configured to boost a pressure of fuel supplied from a feed pump and an injector configured to inject the fuel discharged by the high-pressure fuel pump,
the engine control device comprising:
an air-bypass valve control unit configured to control the air-bypass valve;
an abnormality detection unit configured to detect an abnormality in the high-pressure fuel system; and
a waste gate valve control unit configured to control the waste gate valve,
wherein the air-bypass valve control unit is configured to increase an opening degree of the air-bypass valve in accordance with detection of the abnormality by the abnormality detection unit,
the abnormality detection unit performs first diagnosis and second diagnosis that needs a time longer than the first diagnosis,
the waste gate valve control unit increases an opening degree of the waste gate valve and the air-bypass valve control unit maintains the opening degree of the air-bypass valve when the abnormality is detected in the first diagnosis, and
the waste gate valve control unit increases the opening degree of the waste gate valve and the air-bypass valve control unit increases the opening degree of the air-bypass valve when the abnormality is detected in the second diagnosis.

2. The engine control device according to claim 1, wherein
the first diagnosis is performed on a basis of an energization characteristic of the injector, and
the second diagnosis is performed on a basis of history of a pressure of the fuel.

3. An engine control device configured to control an engine,
the engine comprising
a turbo-supercharger that has a turbine to be driven by exhaust gas and a compressor to be driven by the turbine,
a waste gate valve provided in a waste gate passage that allows the exhaust gas to bypass the turbine,
an air-bypass valve provided in an air-bypass passage that allows fresh air to bypass the compressor, and
a high-pressure fuel system that has a high-pressure fuel pump configured to boost a pressure of fuel supplied from a feed pump and an injector configured to inject the fuel discharged by the high-pressure fuel pump,
the engine control device comprising circuitry configured to
control the air-bypass valve,
detect an abnormality in the high-pressure fuel system, and
control the waste gate valve wherein,
the circuitry is configured to increase an opening degree of the air-bypass valve in accordance with detection of the abnormality,
the circuitry is configured to perform first diagnosis and second diagnosis that needs a time longer than the first diagnosis,
the circuitry is configured to increase an opening degree of the waste gate valve and maintain the opening degree of the air-bypass valve when the abnormality is detected in the first diagnosis, and
the circuitry is configured to increase the opening degree of the waste gate valve and increase the opening degree of the air-bypass valve when the abnormality is detected in the second diagnosis.

\* \* \* \* \*